US012625097B2

(12) United States Patent
Murano et al.

(10) Patent No.: US 12,625,097 B2
(45) Date of Patent: May 12, 2026

(54) X-RAY SPECTRUM ANALYSIS APPARATUS AND METHOD

(71) Applicants: JEOL Ltd., Tokyo (JP); TOHOKU UNIVERSITY, Sendai (JP)

(72) Inventors: Takanori Murano, Tokyo (JP); Shogo Koshiya, Tokyo (JP); Masami Terauchi, Sendai (JP)

(73) Assignees: JOEL Ltd., Tokyo (JP); TOHOKU UNIVERSITY, Sendai (JP)

( * ) Notice: Subject to any disclaimer, the term of this patent is extended or adjusted under 35 U.S.C. 154(b) by 951 days.

(21) Appl. No.: 17/697,202

(22) Filed: Mar. 17, 2022

(65) Prior Publication Data

US 2022/0299457 A1 Sep. 22, 2022

(30) Foreign Application Priority Data

Mar. 22, 2021 (JP) ................................. 2021-047329

(51) Int. Cl.
*G01N 23/2252* (2018.01)

(52) U.S. Cl.
CPC ... *G01N 23/2252* (2013.01); *G01N 2223/079* (2013.01); *G01N 2223/40* (2013.01)

(58) Field of Classification Search
None
See application file for complete search history.

(56) References Cited

U.S. PATENT DOCUMENTS

| | | | |
|---|---|---|---|
| 6,614,524 B1* | 9/2003 | Kuwabara | G01N 21/274 |
| | | | 250/339.09 |
| 2010/0027748 A1* | 2/2010 | Rohde | G01N 23/2252 |
| | | | 378/82 |
| 2012/0292508 A1 | 11/2012 | Terauchi et al. | |
| 2013/0266120 A1 | 10/2013 | Imazono et al. | |
| 2020/0393393 A1 | 12/2020 | Takahashi | |

FOREIGN PATENT DOCUMENTS

| | | | |
|---|---|---|---|
| CN | 102419340 B | * | 6/2014 |
| EP | 2647983 A2 | | 9/2013 |
| EP | 3705878 A1 | | 9/2020 |
| EP | 3757557 A1 | | 12/2020 |
| JP | 1144556 A | | 6/1989 |
| JP | H10111261 A | | 4/1998 |
| JP | 2001305081 A | | 10/2001 |
| JP | 2006177752 A | | 7/2006 |

(Continued)

OTHER PUBLICATIONS

Extended European Search Report issued in EP22160145.3 on Jul. 29, 2022.

(Continued)

*Primary Examiner* — Andrew Smyth
(74) *Attorney, Agent, or Firm* — The Webb Law Firm

(57) ABSTRACT

A soft X-ray measurement device detects a characteristic X-ray emitted from a sample including a primary element and a secondary element. An X-ray spectrum generated by a spectrum generator includes a waveform of interest which is an intrinsic waveform of the primary element, caused by transition of electrons from a valence band to an inner shell in the primary element. A secondary element analyzer calculates quantitative information of the secondary element through analysis of the waveform of interest.

7 Claims, 7 Drawing Sheets

(56)  References Cited

FOREIGN PATENT DOCUMENTS

| | | | | |
|---|---|---|---|---|
| JP | WO2006013728 | A1 * | 5/2008 | ........... G01N 23/223 |
| JP | 201232261 | A | 2/2012 | |
| JP | 201233370 | A | 2/2012 | |
| JP | 2012181091 | A * | 9/2012 | |
| JP | 2012255689 | A | 12/2012 | |
| JP | 2020204483 | A | 12/2020 | |
| WO | 2010022409 | A2 | 2/2010 | |
| WO | 2011122142 | A1 | 10/2011 | |

OTHER PUBLICATIONS

Terauchi et al.; Chemical State Analysis with Soft-X-ray Emission
Spectroscopy Based on SEM; vol. 36, No. 4, pp. 184-188; 2015.
Office Action issued in JP2021047329 on Mar. 28, 2023.

* cited by examiner

X-RAY SPECTRUM ANALYSIS APPARATUS AND METHOD

CROSS REFERENCE TO RELATED APPLICATION

This application claims priority to Japanese Patent Application No. 2021-047329 filed Mar. 22, 2021, the disclosure of which is hereby incorporated by reference in its entirety.

BACKGROUND OF THE INVENTION

Field of the Invention

The present disclosure relates to an X-ray spectrum analysis apparatus and method, and in particular to analysis of a characteristic X-ray spectrum acquired from a sample which includes a primary element and a secondary element.

Description of Related Art

In recent years, an apparatus which measures a characteristic X-ray belonging to a soft X-ray region having an energy lower than a few hundreds of eV's has attracted attention. By observing and analyzing a spectrum of the characteristic X-ray, a state of a valence band in a particular element in a sample, such as, for example, a form of chemical bonding between atoms, can be analyzed. For example, a soft X-ray spectrometer is provided in a scanning electron microscope (SEM), an electron probe microanalyzer (EPMA), or the like.

Document 1 (Terauchi et al., Chemical State Analysis with Soft-X-ray Emission Spectroscopy Based on SEM, Surface Science, Vol. 36, No. 4, pp. 184-188, 2015) discloses a scanning electron microscope with a soft X-ray spectrometer, and discloses a plurality of soft X-ray spectra acquired from a plurality of samples having different compositions. While Document 1 mentions a deviation among the plurality of soft X-ray spectra, Document 1 does not disclose a method of quantitatively analyzing a secondary element in the sample based on a signal acquired from a primary element in the sample.

Document 2 (JP 2012-255689 A) and Document 3 (JP 2001-305081 A) disclose a method of quantitatively analyzing a minute-quantity element, but do not disclose a method of quantitatively analyzing a secondary element in the sample based on a signal acquired from a primary element in the sample.

When a primary element dominantly exists in a sample and a minute quantity of a secondary element (for example, an additive or an impurity) also exists in the sample, even if detection of a characteristic X-ray emitted from the secondary element is attempted, a signal intensity that can be acquired is not sufficient. Even if the characteristic X-ray spectrum of the secondary element is observed, a result of quantitative analysis based on such a characteristic X-ray spectrum would include a large error. On the other hand, when an illumination current for an electron beam to be illuminated onto the sample is increased in order to increase the intensity of the characteristic X-ray emitted from the secondary element, a problem of damages of the sample tends to occur more easily. In order to improve the signal-to-noise (S/N) ratio, a configuration may be considered in which a signal accumulation time is elongated. In this case, however, a measurement time would consequently be elongated. It would be very convenient if the signal acquired from the primary element, included in the sample in a large quantity, can be utilized or referred to, for the quantitative analysis of the secondary element, but no such measurement method has been realized.

SUMMARY OF THE INVENTION

An advantage of the present disclosure lies in provision of an X-ray spectrum analysis apparatus and method which can acquire quantitative information of the secondary element with high precision, when a sample includes the primary element and the secondary element. Alternatively, an advantage of the present disclosure lies in realization of a novel measurement method which allows calculation of the quantitative information of the secondary element based on the signal acquired from the primary element.

According to one aspect of the present disclosure, there is provided an X-ray spectrum analysis apparatus comprising: a generator that generates an X-ray spectrum including a waveform of interest which is an intrinsic waveform of a primary element, caused by transition of electrons from a valence band to an inner shell in the primary element, based on a detection signal acquired through detection of a characteristic X-ray emitted from a sample including the primary element and a secondary element; and an analyzer that generates quantitative information of the secondary element through analysis of the waveform of interest.

According to another aspect of the present disclosure, there is provided an X-ray spectrum analysis method for analyzing an X-ray spectrum including a waveform of interest, wherein the X-ray spectrum is generated based on a detection signal acquired through detection of a characteristic X-ray emitted from a sample including a primary element which is known and a secondary element which is known, the waveform of interest is an intrinsic waveform of the primary element, caused by transition of electrons from a valence band to an inner shell in the primary element, a form of the waveform of interest changes according to a content of the secondary element in the sample, and the X-ray spectrum analysis method comprises: calculating an amount of change of the form of the waveform of interest by comparing the waveform of interest with a reference waveform; and calculating the content of the secondary element based on the amount of change.

According to another aspect of the present disclosure, there is provided a program executed by an information processing device, the program comprising the functions of: generating an X-ray spectrum including a waveform of interest which is an intrinsic waveform of a primary element, caused by transition of electrons from a valence band to an inner shell in the primary element, based on a detection signal acquired through detection of a characteristic X-ray emitted from a sample including the primary element and a secondary element; and generating quantitative information of the secondary element through analysis of the waveform of interest.

BRIEF DESCRIPTION OF DRAWINGS

Embodiment(s) of the present disclosure will be described based on the following figures, wherein:

FIG. 1 is a block diagram showing an X-ray spectrum analysis apparatus according to an embodiment of the present disclosure;

FIG. 8 is a diagram showing another method of analysis.

DESCRIPTION OF THE INVENTION

Figure 2:
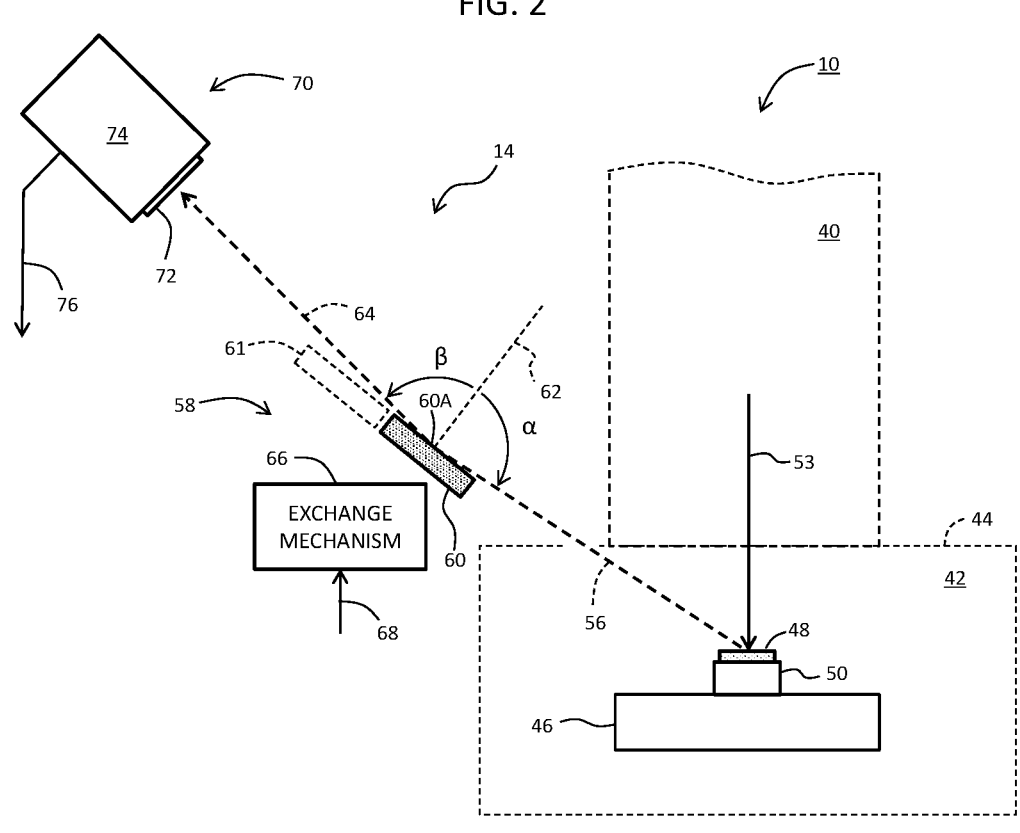
FIG. 2 is a diagram showing an example structure of a soft X-ray measurement device.

An embodiment of the present disclosure will now be described with reference to the drawings.

(1) Overview of Embodiment

An X-ray spectrum analysis apparatus according to an embodiment of the present disclosure comprises a generator and an analyzer. The generator generates an X-ray spectrum including a waveform of interest which is an intrinsic waveform of a primary element, caused by transition of electrons from a valence band to an inner shell in the primary element, based on a detection signal acquired through detection of a characteristic X-ray emitted from a sample including the primary element and a secondary element. The analyzer acquires quantitative information of the secondary element through analysis of the waveform of interest.

A state of a valence band (outer shell) in an atom changes due to an influence of other atoms existing at a periphery thereof. The characteristic X-ray (in particular, the characteristic X-ray belonging to a soft X-ray region) caused by transition of the electrons from the valence band to the inner shell reflects the state of the valence band. Thus, it becomes possible to acquire information of the secondary element existing at the periphery of the primary element which is an observation target, through analysis of the X-ray spectrum generated through observation of the characteristic X-ray. Based on this idea, the configuration described above quantitatively analyzes the secondary element existing at the periphery of the primary element, based on the waveform of interest intrinsic to the primary element, caused by the transition of the electrons from the valence band to the inner shell.

Because a sample includes the primary element in a large quantity, normally, the waveform of interest relatively significantly appears in the X-ray spectrum (or a waveform which significantly appears is selected as the waveform of interest). Thus, even when there is only a minute quantity of the secondary element in the sample and observation of a waveform derived from the secondary element is difficult, the quantitative analysis of the secondary element can be enabled, so long as a certain condition is satisfied. According to the above-described configuration, because the illumination current for the electron beam does not need to be increased, the problem of damages of the sample can be avoided. Further, because the signal accumulation period does not need to be elongated, the measurement time can be shortened.

Further, the above-described configuration presumes that the waveform of interest intrinsic to the primary element changes according to a content of the secondary element in the sample. The primary element and the secondary element are a combination of two elements meeting this presumption. For example, the above-described configuration effectively functions when the primary element and the secondary element are known, and the content of the secondary element is unknown. Even when the sample contains a third element different from the primary element and the secondary element, the above-described configuration can successfully function, so long as the third element does not affect the waveform of interest or only slightly affects the waveform of interest. A spectrum generator to be described later corresponds to the generator, and a secondary element analyzer to be described later corresponds to the analyzer.

In the present disclosure, an L-line peak and a K-line peak included in the X-ray spectrum are called waveforms. The above-described quantitative information is typically a content, and the concept of the content includes a content ratio, a concentration, and the like.

In an embodiment of the present disclosure, the analyzer comprises: a storage which stores a reference waveform; a comparator which compares the waveform of interest with the reference waveform; and a calculator which acquires the quantitative information of the secondary element based on a result of comparison by the comparator. In this configuration, a waveform change according to the content of the secondary element is identified through comparison of the waveform of interest and the reference waveform. For example, through the comparison of the waveform of interest with the reference waveform, an amount of shift may be identified as a characteristic quantity. The quantitative information of the secondary element is then calculated based on the amount of shift. As other characteristic quantities, there may be exemplified a peak level difference, a peak ratio, an area difference, an area ratio, and the like. Alternatively, the quantitative information of the secondary element may be calculated based on a plurality of characteristic quantities. Alternatively, the quantitative information of the secondary element may be calculated based on the waveform of interest using a learned estimator. A reference waveform storage to be described later corresponds to the storage, a comparison device to be described later corresponds to the comparator, and a content calculation device to be described later corresponds to the calculator.

In an embodiment of the present disclosure, the reference waveform is a waveform included in an X-ray spectrum generated based on a detection signal acquired through detection of a characteristic X-ray emitted from a reference sample which includes the primary element and which does not include the secondary element, and is an intrinsic waveform of the primary element, caused by transition of electrons from the valence band to the inner shell in the primary element. In this configuration, the reference waveform is formed in advance by means of the reference sample which does not include the secondary element. Alternatively, a plurality of reference waveforms may be acquired from a plurality of reference samples having different contents of the secondary element, and the content of the secondary element may be identified by identifying a reference waveform closest to the waveform of interest, among the plurality of reference waveforms.

In an embodiment of the present disclosure, the calculator calculates a content of the secondary element as the quantitative information of the secondary element based on the result of comparison, according to a calibration curve which is generated in advance. The calibration curve can be generated in advance through measurement of a plurality of standard samples having different contents of the secondary element.

In an embodiment of the present disclosure, the comparator determines an amount of shift as the result of comparison between the waveform of interest and the reference waveform. The calculator calculates the quantitative information of the secondary element based on the amount of shift. In an embodiment of the present disclosure, the amount of shift is defined, for example, as a distance between a center of gravity of a particular peak in the waveform of interest and a center of gravity of a particular peak in the reference waveform.

In an embodiment of the present disclosure, the generator generates a plurality of X-ray spectra acquired from a plurality of positions in the sample. The analyzer calculates a plurality of sets of quantitative information through analysis of a plurality of waveforms of interest included in the plurality of X-ray spectra. A map generator is provided which generates a secondary element map based on the plurality of quantitative information. According to this configuration, a two-dimensional distribution of the content of the secondary element can be visually identified.

An X-ray spectrum analysis apparatus of an embodiment of the present disclosure further comprises a sample image generator and a combined image generator. The sample image generator generates a sample image representing the sample. The combined image generator generates a combined image by combining the secondary element map and the sample image. The sample image is, for example, a backscattered electron image, a secondary electron image, or the like. A combiner to be described later corresponds to the combined image generator.

An X-ray spectrum analysis method according to an embodiment of the present disclosure is a method of analyzing an X-ray spectrum including a waveform of interest. The X-ray spectrum is generated based on a detection signal acquired through detection of a characteristic X-ray emitted from a sample including a primary element which is known and a secondary element which is known. The waveform of interest is an intrinsic waveform of the primary element, caused by transition of electrons from a valence band to an inner shell in the primary element. A form of the waveform of interest changes according to a content of the secondary element in the sample. The X-ray spectrum analysis method according to the embodiment of the present disclosure comprises an amount-of-change calculating step and a quantitative information calculating step. In the amount-of-change calculating step, the waveform of interest is compared with a reference waveform, to calculate an amount of change of the form of the waveform of interest. In the quantitative information calculating step, the content of the secondary element is calculated based on the amount of change.

A program according to an embodiment of the present disclosure is a program executed by an information processing device. The program comprises a generation function and an analysis function. The generation function is a function of generating an X-ray spectrum including a waveform of interest which is an intrinsic waveform of a primary element, caused by transition of electrons from a valence band to an inner shell in the primary element, based on a detection signal acquired through detection of a characteristic X-ray emitted from a sample including the primary element and a secondary element. The analysis function is a function of generating quantitative information of the secondary element through analysis of the waveform of interest.

The program is installed to the information processing device via a transportable recording medium or a network. The concept of the information processing device may include a computer, an X-ray spectrum processing apparatus, a scanning electron microscope, an electron probe microanalyzer, and the like. The program may be stored in a non-transitory recording medium in the information processing device.

(2) Detail of Embodiment

Figure 1:
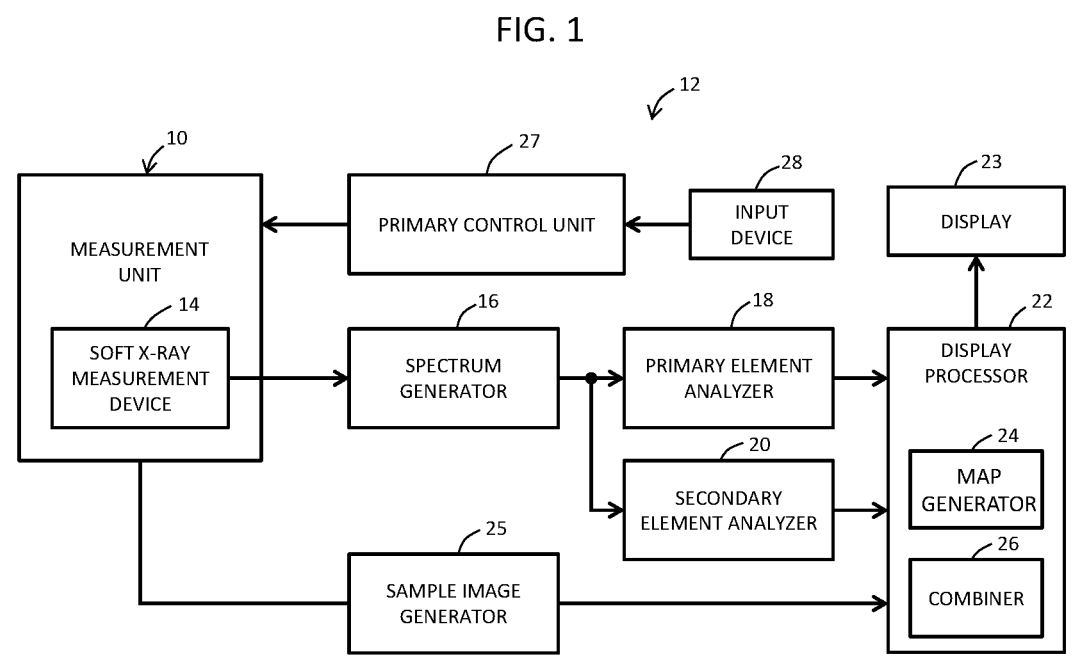

FIG. 1 shows an X-ray spectrum analysis apparatus according to an embodiment of the present disclosure. The illustrated X-ray spectrum analysis apparatus is a scanning electron microscope having a soft X-ray spectroscopy function. A sample to be measured is, for example, boron in a silicon substrate (more specifically, the primary element is Si and the secondary element is B), a negative electrode material in a lithium-ion battery (more specifically, the primary element is Si and the secondary element is Li), or the like. The secondary element corresponds to an additive or an impurity. Alternatively, a steel material may be set as the measurement target. In this case, a minute-quantity element in the steel material is the secondary element. A content ratio (weight %) of the secondary element in the sample is a few % or less, and is more specifically 1% or less.

A composition of the sample (in particular, the combination of the primary element and the secondary element) is known, and only the content of the secondary element is unknown. When the secondary element is contained in the sample in only a minute quantity, normally, quantitative analysis of the secondary element is difficult. In the present embodiment, as will be described below, the quantitative information of the secondary element can be determined based on an intrinsic waveform of the primary element, which significantly appears in the X-ray spectrum.

The X-ray spectrum analysis apparatus comprises a measurement unit 10 and an information processing unit 12. The measurement unit 10 comprises a soft X-ray measurement device 14, which has a spectroscopy function. In the present embodiment, the soft X-ray measurement device 14 is formed from a wavelength-dispersive X-ray spectrometer, but alternatively, the soft X-ray measurement device 14 may be formed from an energy-dispersive X-ray spectrometer. A soft X-ray detection signal is sent from the measurement unit 10 to the information processing unit 12. In addition, a backscattered electron detection signal and a secondary electron detection signal are sent from the measurement unit 10 to the information processing unit 12. An example of the specific configuration of the measurement unit 10 will be described later with reference to FIG. 2.

In FIG. 1, the information processing unit 12 is formed from a computer, and functions as a control unit and a calculating unit. The computer has a processor which executes a program. The processor is formed from a CPU (Central Processing Unit). In FIG. 1, a plurality of functions realized by the processor are represented by a plurality of blocks (refer to reference numerals 16, 18, 22, 25, and 27).

A spectrum generator 16 generates an X-ray spectrum (characteristic X-ray spectrum) based on the soft X-ray detection signal which is output from the soft X-ray measurement device 14.

The X-ray spectrum includes a waveform of interest which is an intrinsic waveform of the primary element, caused by detection of a characteristic X-ray (such as the K line and the L line) emitted from the primary element in the sample, in which a form of the waveform of interest changes according to a content of the secondary element in the sample. The waveform of interest is a concept corresponding to a peak. Normally, the X-ray spectrum includes a plurality of waveforms corresponding to a plurality of characteristic X-rays caused by the primary element. Among these waveforms, a waveform suited for the quantitative analysis of the secondary element is selected as the waveform of interest. Alternatively, a plurality of waveforms of interest may be referred to in the quantitative analysis of the secondary element.

Information representing the X-ray spectrum generated by the spectrum generator 16 is sent to a primary element analyzer 18 and a secondary element analyzer 20. This information is also sent to a display processor 22, but this sending of the information is not illustrated in FIG. 1.

The primary element analyzer 18 executes qualitative analysis and quantitative analysis of the primary element as necessary. Normally, with the analysis of the X-ray spectrum, the composition can be identified, and the content can be identified. Information representing a result of analysis by the primary element analyzer 18 is sent to the display processor 22.

The secondary element analyzer 20 executes quantitative analysis of the secondary element through analysis of the intrinsic waveform of the primary element; that is, the waveform of interest, included in the X-ray spectrum. In the present embodiment, the waveform of interest is compared with a reference waveform, and quantitative information of the secondary element is calculated based on a result of the comparison. The quantitative information is typically the content, and more specifically, is the content ratio.

The reference waveform is an intrinsic waveform of the primary element, included in a reference X-ray spectrum acquired through measurement of a characteristic X-ray emitted from a reference sample which does not include the secondary element. The reference sample and the measurement target sample differ from each other in the point of whether or not the secondary element is included, and the composition excluding the secondary element is identical in both samples. In the present embodiment, an amount of shift of the waveform of interest from the reference waveform is calculated, and the content of the secondary element is calculated based on the amount of shift and according to a calibration curve to be described below.

Alternatively, another characteristic quantity different from the amount of shift may be calculated through the comparison between the waveform of interest and the reference waveform, and the quantitative information of the secondary element may be calculated based on the other characteristic quantity. Alternatively, a plurality of characteristic quantities may be calculated through the comparison between the waveform of interest and the reference waveform, and the content of the secondary element may be calculated based on the plurality of characteristic quantities. The calculated quantitative information is sent from the secondary element analyzer 20 to the display processor 22.

The display processor 22 generates an image to be displayed on a display 23. In the illustrated example configuration, the display processor 22 comprises a map generator 24 and a combiner 26. The map generator 24 generates a map serving as a color image showing a two-dimensional content distribution based on a plurality of secondary element contents calculated for a plurality of points (more specifically, a plurality of areas) in the sample. In this process, a coloring process for converting the contents to the colors is applied.

A sample image generator 25 generates a sample image serving as a two-dimensional image representing a sample surface, based on a detection signal which is output through a two-dimensional scanning of an electron beam with respect to the sample. In this process, the backscattered electron detection signal may be utilized, or the secondary electron detection signal may be utilized. The sample image is, for example, a black-and-white image.

The combiner 26 is a combined image generation means, and generates a combined image by superposing a map over the sample image. The quantitative information of the secondary element is displayed on the display 23 as numerical value information. When the electron beam is two-dimensionally scanned with respect to the sample, the combined image is displayed on the display 23. In this case, a plurality of quantitative information acquired from a plurality of points may be displayed as numerical value information. The display is formed from, for example, a liquid crystal display (LCD).

A primary control unit 27 controls operations of various elements of the X-ray spectrum analysis apparatus, and, in particular, controls an operation of the measurement unit 10. An input device 28 is connected to the primary control unit 27. The inputter 28 is formed from a keyboard, a pointing device, or the like. An ROI (region of interest) to be described later may be set by a user using the input device 28.

FIG. 2 shows an example configuration of the measurement unit 10. The illustrated measurement unit 10 comprises a lens barrel 40, a housing 44, and the soft X-ray measurement device 14. An electron gun, a lens system, a deflector, and the like are housed in the lens barrel 40. An inside of the housing 44 is a sample chamber 42. A movable stage 46 is provided in the sample chamber 42. A holder 50 which holds a sample 48 is fixed on the movable stage 46.

When an electron beam 53 is illuminated to a measurement point on the sample 48, various characteristic X-rays are caused to be emitted from the measurement point. Of these characteristic X-rays, for example, a soft X-ray having an energy of less than 300 eV, less than 200 eV, or less than 100 eV is measured by the soft X-ray measurement device 14. A lower limit of the measurement range is, for example, a few tens of eV's, and is more specifically 30 eV, 40 eV, or 50 eV.

The soft X-ray measurement device 14 is a wavelength-dispersive soft X-ray measurement device. The soft X-ray measurement device 14 comprises a wavelength dispersion device 58, a CCD camera (Charge Coupled Device camera) 72, a controller 74, or the like. The wavelength dispersion device 58 comprises a plurality of diffraction gratings (a plurality of gratings) 60, 61, an exchange mechanism 66, or the like. Each of the diffraction gratings 60, 61 functions as a spectrometer.

The diffraction grating 60 realizes a wavelength dispersion function in a range of, for example, 50~170 eV. The diffraction grating 61 realizes the wavelength dispersion function in a range of, for example, 70~210 eV. The diffraction gratings 60, 61 are selectively used. The exchange mechanism 66 is a mechanism which selects the diffraction grating 60, 61 to be used. With a rotational movement or a linear movement of the exchange mechanism 66, the diffraction grating 60, 61 to be used is exchanged.

A plurality of grooves are formed in an unequal interval on a surface 60A of each of the diffraction gratings 60, 61. The interval of the plurality of grooves is varied for the purpose of aberration correction. With respect to an incident X-ray 56, an emission X-ray 64 is caused with an emission angle according to the wavelength. In FIG. 2, an angle of incidence of the incident X-ray 56 is shown with a, and an emission angle of the emission X-ray 64 is shown with β.

Reference numeral 62 shows a center line, which is a line normal to the surface 60A. The surface 60A is slightly curved.

Reference numeral 68 shows a signal for controlling the operation of the exchange mechanism 66. Reference numeral 76 shows a detection signal. The CCD camera 72 has a plurality of detection elements which are two-dimensionally arranged. A plurality of detection signals are accumulated for each wavelength; that is, for each detection element array. A spectrum is generated based on the detection signal 76 which is output from the controller 74.

Figure 3:
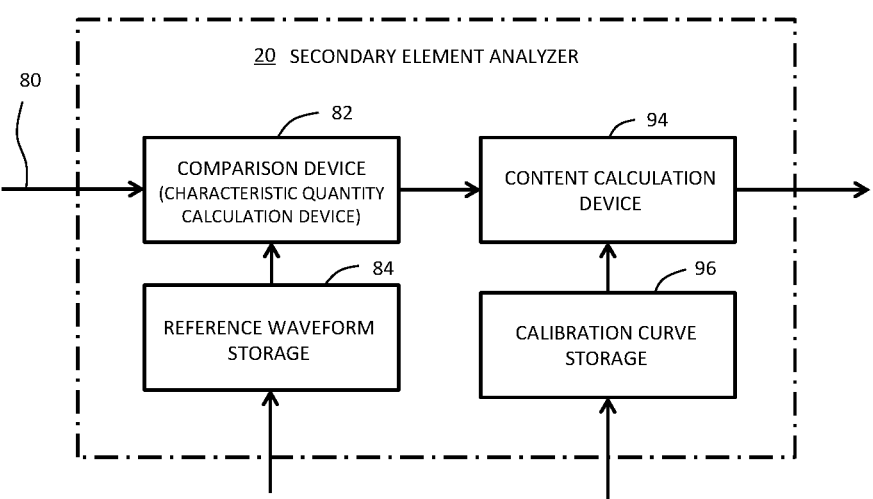
FIG. 3 is a block diagram showing an example structure of a secondary element analyzer.

FIG. 3 shows an example structure of the secondary element analyzer 20 shown in FIG. 1. In the secondary element analyzer 20, a comparison device 82 compares the waveform of interest in an X-ray spectrum 80 with a reference waveform stored in a reference waveform storage 84, to calculate a characteristic quantity for the waveform of interest.

For example, an ROI is set for the X-ray spectrum 80 acquired from the sample, and a waveform in the ROI is set as the waveform of interest. Prior to this process, an ROI is set with respect to an X-ray spectrum acquired from the reference sample, and a waveform included in the ROI is set as the reference waveform. The reference waveform is stored in the reference waveform storage 84 in advance. Alternatively, a configuration may be employed in which the reference waveform is acquired after the waveform of interest is acquired.

The two ROIs described above are set at the same position. In other words, a horizontal axis and a vertical axis of the waveform of interest coincide with a horizontal axis and a vertical axis of the reference waveform. Alternatively, a particular portion of the waveform in each ROI may be set as the waveform of interest or the reference waveform, in place of an entirety of the waveform in each ROI. In a configuration shown in FIG. 4 and described later, two particular peaks in each ROI are set as the waveforms of interest or the reference waveforms.

The comparison device 82 compares the waveform of interest with the reference waveform, to calculate the characteristic quantity. As the characteristic quantity, specifically, an amount of shift serving as a peak-to-peak distance may be exemplified. When the amount of shift changes according to the content of the secondary element in the sample, the content of the secondary element may be calculated based on the amount of shift. A calibration curve for determining the content of the secondary element from the size of the characteristic quantity is generated in advance, and is stored in a calibration curve storage 96.

A content calculation device 94 calculates the content of the secondary element based on the size of the characteristic quantity and according to the calibration curve. For example, when the calibration curve shows a relationship between the amount of shift and the content of the secondary element, the content calculation device 94 calculates the content of the secondary element based on the amount of shift and according to the calibration curve. Information indicating the content is sent to the display processor.

When a plurality of observation areas are set in the sample, a plurality of contents corresponding to the plurality of observation areas are calculated. In this case, a plurality of X-ray spectra may be acquired from a plurality of points in each individual observation area and an average content may be calculated based on the plurality of X-ray spectra, or an X-ray spectrum may be acquired from a representative point in each individual observation area, and the content may be calculated based on the acquired X-ray spectrum.

Figure 4:
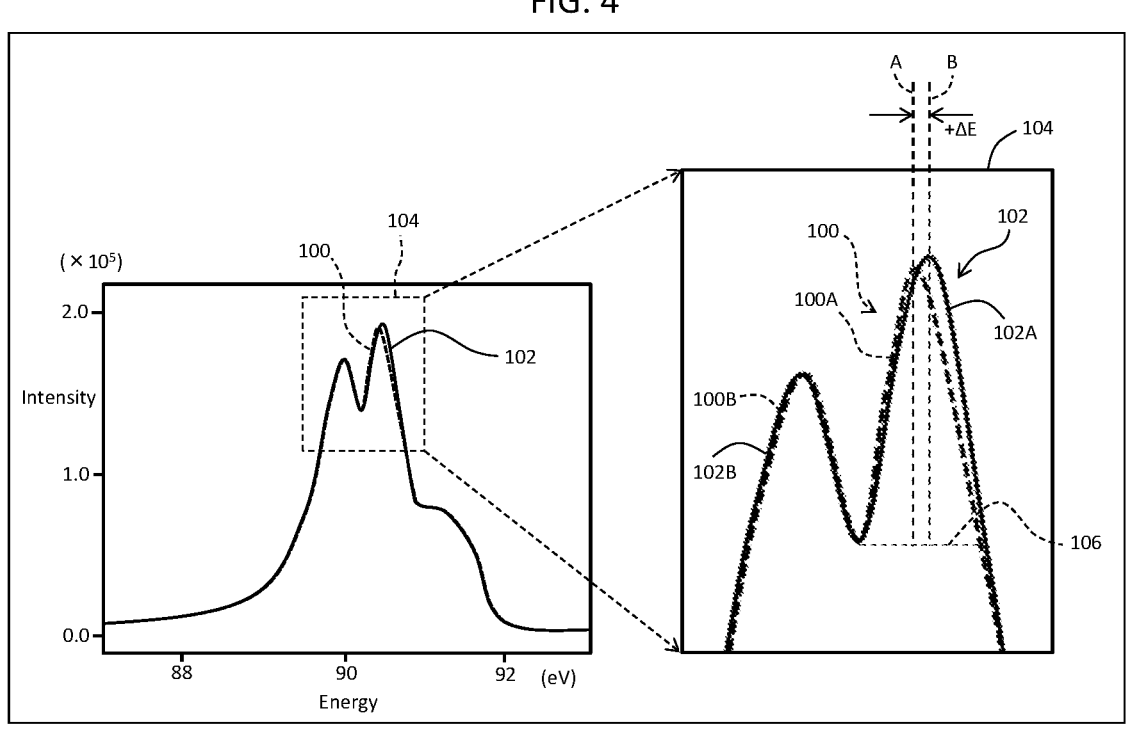
FIG. 4 is a diagram showing an example of a method of analyzing a waveform of interest.

FIG. 4 shows an example configuration of a method of analyzing the waveform of interest. An X-ray spectrum 100 acquired from the reference sample is represented with a broken line, and an X-ray spectrum 102 acquired from the sample is represented with a solid line. A horizontal axis shows energy of the characteristic X-ray; that is, the wavelength of the characteristic X-ray. A vertical axis shows intensity of the characteristic X-ray. FIG. 4 is a schematic diagram created for the purpose of easier understanding. This is similarly true for FIG. 8 to be described later.

FIG. 4 includes an enlarged portion of an inside of an ROI 104. In the ROI 104, the X-ray spectrum 100 has two peaks 100A and 100B. The X-ray spectrum 102 has two peaks 102A and 102B. A difference reflecting the presence/absence of the secondary element appears between the X-ray spectrum 100 and the X-ray spectrum 102.

For example, a bottom level 106 of the peaks 100A and 102A is defined based on a level of an adjacent valley, and a region on or above the bottom level is set as a center-of-gravity calculation target (area calculation target). Alternatively, the area calculation target may be identified with reference to a half width or a fixed value.

Through area calculation of the peak 100A, a center-of-gravity position A of the peak 100A is identified. Similarly, a center-of-gravity position B of the peak 102A is identified through the area calculation of the peak 102A. An amount of change from the center-of-gravity position A to the center-of-gravity position B is identified as an amount of shift $\Delta E$.

For example, when a reference sample formed solely from an Si (silicon) material, and a sample formed from an Si material which contains B (boron) in a minute quantity, are observed, a difference as illustrated in the figure appears between two Si-L-line peaks acquired as a result of the observation. A similar phenomenon may occur for a C (carbon) negative electrode material or an Si negative electrode material in a lithium-ion battery. Specifically, when a C negative electrode material formed solely from C and a C negative electrode material which contains Li (lithium) in a slight amount are observed, a difference may appear between two C—K-line peaks acquired as a result of the observation. Similarly, when a Si negative electrode material formed solely from Si and an Si negative electrode material which contains Li in a slight amount are observed, a difference may be caused between Si-L-line peaks acquired as a result of the observation. The method of the present embodiment may be applied to the combinations described above, and to any combination for which the above-described theory is applicable.

Figure 5:
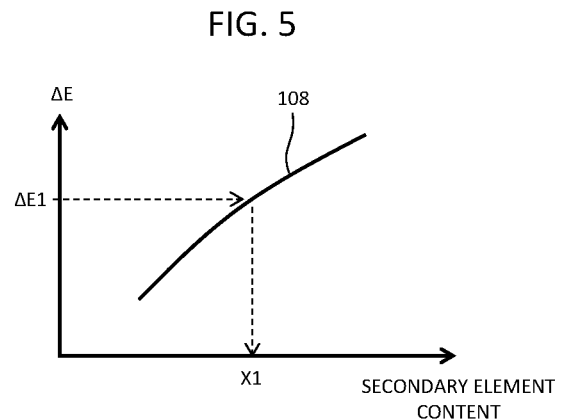
FIG. 5 is a diagram showing an example of a calibration curve.

FIG. 5 schematically shows an example of the calibration curve. A vertical axis shows the amount of shift, and a horizontal axis shows the content of the secondary element. Alternatively, the content may be read as the content ratio. When a certain amount of shift $\Delta E1$ is calculated, a content $X1$ of the secondary element can be identified by fitting the amount of shift $\Delta E1$ to a calibration curve 108.

Figure 6:
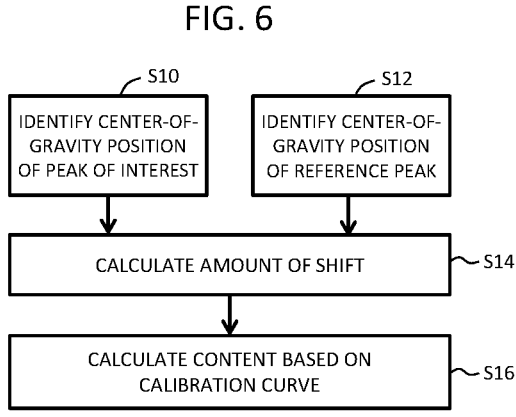
FIG. 6 is a flowchart showing a method of quantitating a secondary element.

FIG. 6 shows a calculation method (calculation algorithm) according to the present embodiment. In S10, the center-of-gravity position of the waveform of interest is identified, and in S12, the center-of-gravity position of the reference waveform is identified. Alternatively, the center-of-gravity position of the reference waveform may be calculated and stored in advance. In S14, the amount of shift is calculated as a difference between the two center-of-gravity positions. In S16, the content of the secondary element is calculated based on the amount of shift and according to the calibration curve.

Figure 7:
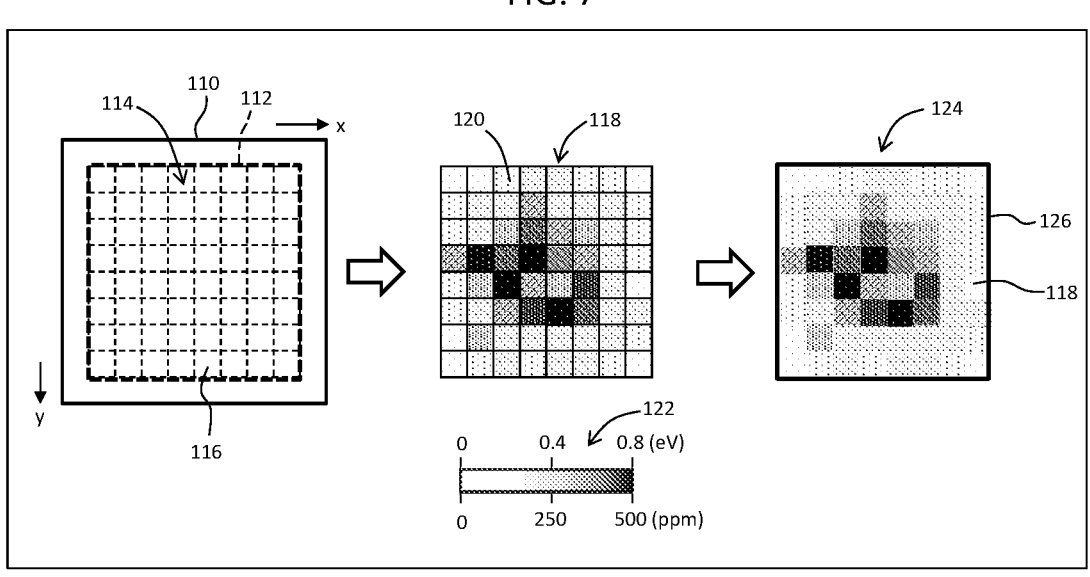
FIG. 7 is a diagram showing a generation method of a combined image.

FIG. 7 schematically shows a method of generating the combined image. In the illustrated example configuration, a scan area 112 is set on a sample 110. The scan area 112 is a region in which an electron beam is two-dimensionally scanned. The scan area 112 is divided into a plurality of observation areas 116, and an observation area matrix 114 is thus formed.

For each individual observation area, a plurality of X-ray spectra are acquired from a plurality of points, and a plurality of contents are calculated based on the plurality of X-ray spectra. Based on the plurality of contents, an average content is calculated. The average content calculated for each individual observation area is converted into a color according to a color bar 122, and the observation area is colored with the converted color, to thereby generate a color patch 120. A map 118 is formed by a plurality of color patches 120 corresponding to the plurality of observation areas.

The map 118 is a color image showing the two-dimensional distribution of the content of the secondary element. The map 118 is combined over a sample image 126 which is separately generated, to generate a combined image 124. In this case, transparency of the map 118 is determined so as to enable observation of the sample image 126 through the map 118. Through observation of the combined image 124, the two-dimensional distribution of the secondary element in the sample can be recognized. For example, it becomes easier to identify how and in what amount the secondary element is distributed.

Figure 8:
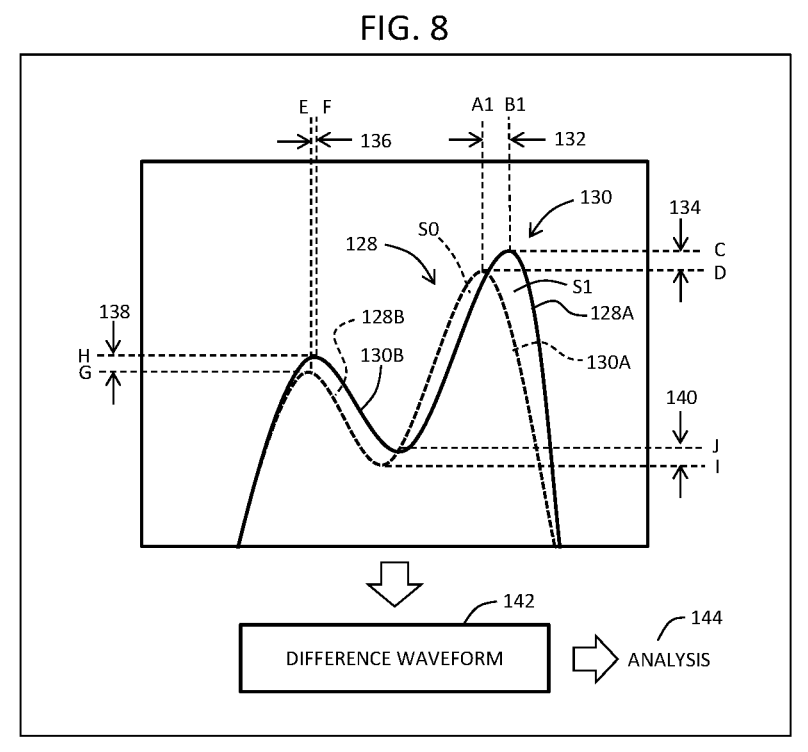

Several alternative configurations will now be described with reference to FIG. 8. In FIG. 8, an X-ray spectrum 128 acquired from the reference sample has a peak 128A and a peak 128B, and an X-ray spectrum 130 acquired from the sample has a peak 130A and a peak 130B. A difference between a peak top position A1 of the peak 128A and a peak top position B1 of the peak 130A may be calculated as the amount of shift serving as the characteristic quantity.

A difference 134 between a peak top level C of the peak 128A and a peak top level D of the peak 130A may be set as the characteristic quantity. Alternatively, a difference between an area S0 of the peak 128A and an area S1 of the peak 130A may be set as the characteristic quantity. Alternatively, a difference 136 between a peak top position E of the peak 128B and a peak top position F of the peak 130B may be set as the characteristic quantity. Similarly, a difference 138 between a peak top level G of the peak 128B and a peak top level H of the peak 130B may be set as the characteristic quantity. Further, a difference 140 between a valley level I between two peaks 128A and 128B and a valley level J between the peaks 130A and 130B may be set as the characteristic quantity. Alternatively, a direction of shift or a direction of change of level may be set as the characteristic quantity.

A plurality of standard samples having different contents of the secondary element may be fabricated through experiments, and a plurality of X-ray spectra may be acquired based on the standard samples, to enable selection of one or a plurality of characteristic quantities to be actually used.

Alternatively, as shown in FIG. 8, the content of the secondary element may be determined by applying a difference calculation for two waveforms in the ROI to generate a difference waveform 142, and analyzing the difference waveform (refer to reference numeral 144). Alternatively, the content of the secondary element may be estimated by preparing a learned estimator and supplying the X-ray spectrum 130 or the difference waveform 142 to the estimator.

According to the present embodiment, the content of the secondary element of a minute quantity can be determined with high precision and in a short period of time based on the intrinsic waveform of the primary element in the X-ray spectrum. In the present embodiment, as the sample to be measured, there may be exemplified metals, semiconductors, insulators, and the like. In the above-described embodiment, in addition to the quantitative analysis of the secondary element, the chemical bonding state between the primary element and the secondary element may be analyzed.

The invention claimed is:

1. An X-ray spectrum analysis apparatus comprising:
a generator that generates a first X-ray spectrum comprising a waveform of interest which is an intrinsic waveform of a primary element, caused by transition of electrons from a valence band to an inner shell in the primary element, based on a detection signal acquired through detection of a characteristic X-ray emitted from a sample comprising the primary element and a secondary element; and
an analyzer that acquires quantitative information of the secondary element by comparing the waveform of interest with a reference waveform, determining an amount of shift as a result of the comparison between the waveform of interest and the reference waveform, and calculating the quantitative information of the secondary element based on the amount of shift,
wherein the reference waveform is a waveform included in a second X-ray spectrum generated based on a detection signal acquired through detection of a characteristic X-ray emitted from a reference sample, and is an intrinsic waveform of the primary element in the reference sample, caused by transition of electrons from the valence band to the inner shell in the primary element,
the reference sample does not include the secondary element,
each of the first X-ray spectrum and the second X-ray spectrum is a spectrum of a soft X-ray having an energy of less than 100 eV, and
a content ratio of the secondary element in the sample is 1% or less.

2. The X-ray spectrum analysis apparatus according to claim 1, wherein
the analyzer comprises:
a storage which stores the reference waveform;
a comparator which compares the waveform of interest with the reference waveform; and
a calculator which calculates the quantitative information of the secondary element based on a result of comparison by the comparator.

3. The X-ray spectrum analysis apparatus according to claim 2, wherein
the calculator calculates a content of the secondary element as the quantitative information of the secondary element based on the result of comparison, according to a calibration curve which is generated in advance.

4. The X-ray spectrum analysis apparatus according to claim 1, wherein
the generator generates a plurality of X-ray spectra corresponding to a plurality of positions in the sample,
the analyzer calculates a plurality of quantitative information of the secondary element through analysis of a plurality of waveforms of interest comprised in the plurality of X-ray spectra, and the X-ray spectrum analysis apparatus further comprises a map generator that generates a secondary element map based on the plurality of quantitative information.

5. The X-ray spectrum analysis apparatus according to claim 4, further comprising:

a sample image generator that generates a sample image representing the sample; and a combined image generator that generates a combined image by combining the secondary element map and the sample image.

6. An X-ray spectrum analysis method for analyzing a first X-ray spectrum comprising a waveform of interest, wherein the first X-ray spectrum is generated based on a detection signal acquired through detection of a characteristic X-ray emitted from a sample comprising a primary element which is known and a secondary element which is known, the waveform of interest is an intrinsic waveform of the primary element, caused by transition of electrons from a valence band to an inner shell in the primary element, a form of the waveform of interest changes according to a content of the secondary element in the sample, and p1 the X-ray spectrum analysis method comprises:

comparing the waveform of interest with a reference waveform;

determining an amount of shift as a result of the comparison between the waveform of interest and the reference waveform; and calculating the content of the secondary element based on the amount of shift, wherein the reference waveform is a waveform included in a second X-ray spectrum generated based on a detection signal acquired through detection of a characteristic X-ray emitted from a reference sample, and is an intrinsic waveform of the primary element in the reference sample, caused by transition of electrons from the valence band to the inner shell in the primary element, the reference sample does not include the secondary element, each of the first X-ray spectrum and the second X-ray spectrum is a spectrum of a soft X-ray having an energy of less than 100 eV, and a content ratio of the secondary element in the sample is 1% or less.

7. A non-transitory recording medium storing a program executed by an information processing device, the program, when executed, causing the information processing device to execute a process comprising:

generating a first X-ray spectrum comprising a waveform of interest which is an intrinsic waveform of a primary element, caused by transition of electrons from a valence band to an inner shell in the primary element, based on a detection signal acquired through detection of a characteristic X-ray emitted from a sample including the primary element and a secondary element; and generating quantitative information of the secondary element by comparing the waveform of interest with a reference waveform, determining an amount of shift as a result of the comparison between the waveform of interest and the reference waveform, and calculating the quantitative information of the secondary element based on the amount of shift, wherein the reference waveform is a waveform included in a second X-ray spectrum generated based on a detection signal acquired through detection of a characteristic X-ray emitted from a reference sample, and is an intrinsic waveform of the primary element in the reference sample, caused by transition of electrons from the valence band to the inner shell in the primary element, the reference sample does not include the secondary element, each of the first X-ray spectrum and the second X-ray spectrum is a spectrum of a soft X-ray having an energy of less than 100 eV, and a content ratio of the secondary element in the sample is 1% or less.

* * * * *